W. L. BLISS.
SPRING.
APPLICATION FILED FEB. 21, 1907.

1,047,491.

Patented Dec. 17, 1912.

WITNESSES:
Herbert J. Smith
H. Perry Hahn

INVENTOR
William L. Bliss
BY:

ATTORNEY

UNITED STATES PATENT OFFICE.

WILLIAM L. BLISS, OF BROOKLYN, NEW YORK, ASSIGNOR, BY MESNE ASSIGNMENTS, TO THE UNITED STATES LIGHT AND HEATING COMPANY, OF NEW YORK, N. Y., A CORPORATION OF MAINE.

SPRING.

1,047,491.     Specification of Letters Patent.     Patented Dec. 17, 1912.

Application filed February 21, 1907. Serial No. 358,587.

*To all whom it may concern:*

Be it known that I, WILLIAM L. BLISS, a citizen of the United States, residing at Brooklyn, in the county of Kings and State of New York, have invented new and useful Improvements in Springs, of which the following is a full, clear, concise, and exact description, reference being had to the accompanying drawing, forming a part of this specification.

My invention relates to springs and attachments therefor and the object of the invention is to provide simply constructed and easily applied means whereby the spring may be attached to or connected with any desired associate elements.

The invention also contemplates a construction such that the combined mechanism is operative under both compressive and tensional strains.

The present application is a continuation of my application for patent for driving mechanism for axle-driven dynamos, filed April 11, 1903, Serial No. 152,130, which application shows the spring applied to a shaft coupling; but it will be understood that my present invention is not restricted in its usefulness to shaft couplings, but is applicable to springs used in a great many situations and for a great variety of purposes.

This invention, broadly considered, consists in making one or more of the convolutions or turns of a helical spring larger or smaller than the main body of the spring and providing attaching means adapted to be secured to these increased or decreased coils. The attaching means may be applied either at one end or both ends of the spring, as desired.

Figure 1:
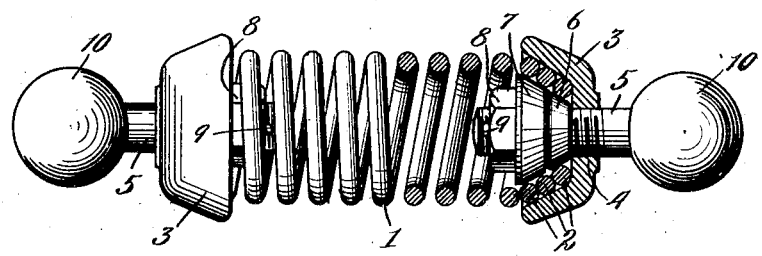
Figure 2:
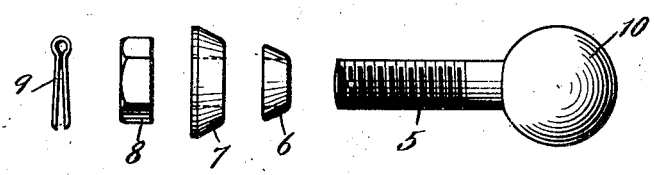
Figure 3:
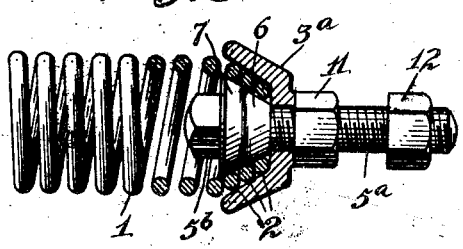

I accomplish my object by the mechanism illustrated in the accompanying drawings, in which:

Figure 1 is a side view partly in section of one form of spring and one form of attachment embodying my invention. Fig. 2 is a side view of different parts of the attaching means shown in Fig. 1, the parts being separated to illustrate their relationship in the assembled device. Fig. 3 is a fragmentary view similar to Fig. 1, but showing a modification in the form of bolt employed.

Referring first to the preferred form of device shown in Figs. 1 and 2, the helical spring 1 has at its ends a number of coils 2, the diameters whereof are smaller than the diameter of the main body of the spring. In this form the end coils diminish in constant ratio so as to form a frustum of a cone at the end of the spring but it is not essential that there should be more than one coil of reduced diameter at the end of the spring, nor that, when more than one reduced coil is employed, the coils should form a true cone or symmetrical taper. The essential feature of this particular design is that there are one or more coils at the end of the spring of a diameter smaller than the diameter of the remainder of the spring to thereby afford means to which may be secured the attaching means hereinafter described. In the best form, however, there are several (preferably three or four) reducing coils at the end of the spring, which coils decrease in diameter preferably in an approximately uniform ratio, as shown.

Over the end of the spring is a cup 3, the inner surface whereof conforms to and fits over the reducing coils 2, above described. The means for holding said cup in close contact with coils 2 may be varied as will hereinafter appear, but a suitable means is shown in assembled position in Fig. 1, and separated in Fig. 2. For this form of bolt or fastening device, a cup 3 has an interiorly threaded aperture 4 into which the threaded bolt 5 is screwed. Bolt 5 is long enough to extend some distance into the spring, and over this inner portion of the bolt is slipped retaining means, which, in the preferred form, consists of two washers 6 and 7. These washers are each thin enough to be slipped between the coils of the spring, at least when the spring is slightly extended, the purpose being to facilitate the assembling of the parts. Said washers are of such configuration that when assembled in proper order upon bolt 5, their exterior surface lies against the inner surface of the reducing coils 2 for o. ing the latter in close contact with cup 3. Washers 6 and 7 when taken together, constitute a built-up retaining member, and it is obvious that such built-up member may consist of any number of parts, depending upon the form of the end coils of the spring and the space between the coils in the main body of the spring. A nut 8 is screwed onto bolt 5 against the inner washer 7 for the purpose of holding the washers tightly and securely in position. Said nut may be readily tightened by means of a special tool provided for the purpose, for example a tool which will hold the nut while the bolt 5 is being rotated for tightening it. In order to prevent said nut from coming off in case it should jar loose, it is desirable to place a pin 9 in the bolt behind said nut.

The form of bolt shown in Figs. 1 and 2 is provided with a ball 10 on the outer extremity which serves as a means of attachment for any coöperating or associated element, such, for example, as the shaft arms shown in the original application hereinabove referred to. I do not wish, however, to be considered as limited to any particular form of bolt, as the form may be considerably varied: For example, the bolt 5ᵃ having a head 5ᵇ integral therewith may slip freely through cup 3ᵃ and be secured in position by means of a nut 11 screwing against the outside of said cup, as shown in Fig. 3. In such case, a second nut 12 or other device may be screwed onto the bolt for holding the exterior mechanism.

The end cup itself may assume various forms without departing from the spirit of my invention, and alternative forms of advantageous design will readily suggest themselves.

Although I have indicated that in the preferred form the end coils form the frustum of a cone, it will be understood that it is not essential that they should do so. The end coils taken as a whole may form an approximately spherical surface, or may be different from any of the ordinary geometric figures. It is desirable that the end coils of the spring should lie close together as shown in the drawings, as this construction increases the security with which the parts maintain their proper relationship, especially when the spring is subjected to tensional strain.

It will be seen that when the parts embodying my invention are assembled, the ends of the spring will be firmly held between the coöperating members at the ends of the spring, and therefore will be firmly and rigidly held in both directions. As a result of this construction there is no lost motion in changing from a compressive to a tensional strain or vice versa. The device, therefore, is particularly adapted for use in connection with shaft couplings operating under conditions where there are frequent fluctuations in the intensity of the driving force, or reversals in the direction of the power transmitted.

What I claim as new and desire to secure by Letters Patent, is:

1. In combination, a helical spring having a conical end, a member having a conical recess therein for receiving the conical end of said spring, a conical member within the end of said spring, said conical member being formed in sections adapted to be inserted between the coils of said spring, and a bolt passing through said first-mentioned member and the several parts of said conical member for causing said members to tightly grip a plurality of the end coils of said spring.

2. In combination, a helical spring having a conical end, an outer member having a conical recess therein for receiving the conical end of said spring, a conical inner member fitting within said spring and comprising a plurality of sections, a bolt threaded into said outer member and extending through said inner member, said bolt having a nut thereon bearing against the back of said inner member and a cotter-pin for preventing displacement of said nut, whereby said bolt may be turned to draw said inner and outer members together to clamp a plurality of the end coils of said spring therebetween, and a head on said bolt for attaching the same to an exterior object.

In witness whereof, I have hereunto subscribed my name in the presence of two witnesses.

WILLIAM L. BLISS.

Witnesses:
E. P. HANNIG,
C. E. MEAD.